United States Patent [19]
Ochi et al.

[11] Patent Number: 5,913,910
[45] Date of Patent: Jun. 22, 1999

[54] CONTROL DEVICE AND METHOD FOR A VEHICLE RUNNING SAFELY

[75] Inventors: Tatsuya Ochi, Hitachi; Toshimichi Minowa, Mito; Kenichirou Kurata, Hitachinaka; Satoru Kuragaki, Hitachi, all of Japan

[73] Assignee: Hitachi, Ltd., Tokyo, Japan

[21] Appl. No.: 08/744,150

[22] Filed: Nov. 12, 1996

[30] Foreign Application Priority Data

Nov. 9, 1995 [JP] Japan ................................. 7-290847

[51] Int. Cl.⁶ ........................... G06F 17/00; G06F 7/00
[52] U.S. Cl. ................... 701/1; 701/28; 701/205; 701/223; 701/301
[58] Field of Search ...................... 701/1, 200, 205, 701/207, 208, 209, 212, 216, 221, 28, 301, 223; 340/988, 990, 995, 937

[56] References Cited

U.S. PATENT DOCUMENTS

| | | | |
|---|---|---|---|
| 5,087,969 | 2/1992 | Kamada et al. | 701/28 |
| 5,233,527 | 8/1993 | Shinnosuke | 701/28 |
| 5,243,524 | 9/1993 | Ishida et al. | 701/28 |
| 5,555,312 | 9/1996 | Shima et al. | 701/301 |

FOREIGN PATENT DOCUMENTS

| | | |
|---|---|---|
| 4-325325 | 12/1992 | Japan . |
| 6-191315 | 7/1994 | Japan . |

*Primary Examiner*—William A. Cuchlinski, Jr.
*Assistant Examiner*—Gertrude Arthur
*Attorney, Agent, or Firm*—Evenson, McKeown Edwards & Lenahan P.L.L.C.

[57] ABSTRACT

It is an object of this invention to provide a control device and method for realizing safe running of a vehicle by making accurate judgment of the driving skill of a driver. The vehicle safe-running control device comprises: a means for setting a target course for a vehicle; a means for determining an actual course followed by a wheel of the vehicle; a course deviation calculation means for calculating a difference between the two course; a driving ability decision means for judging the driving ability of a driver of the vehicle; a control parameter calculation means for calculating control parameters according to the driving ability; and a power train control means required for controlling the running of the vehicle.

20 Claims, 10 Drawing Sheets

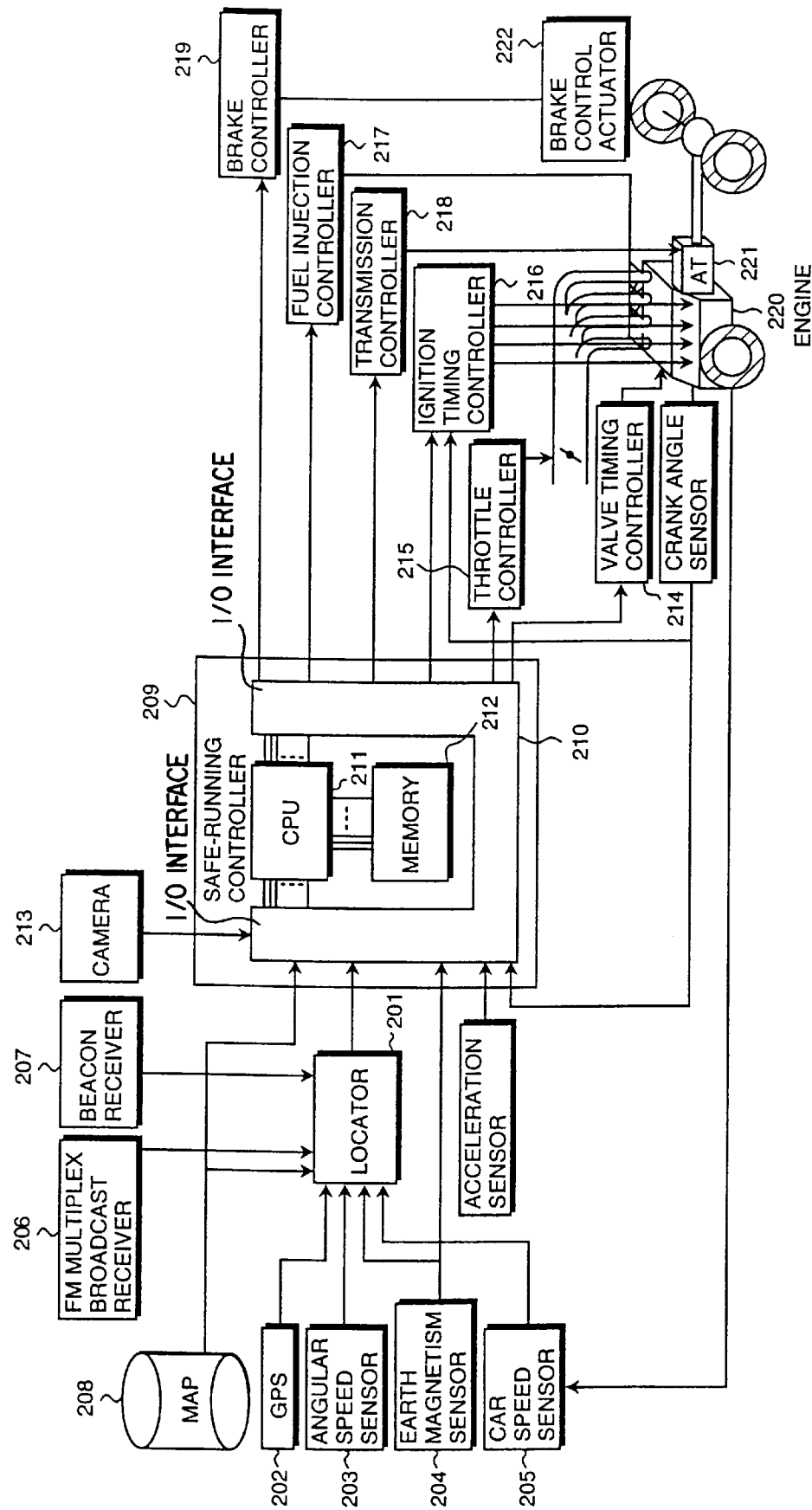

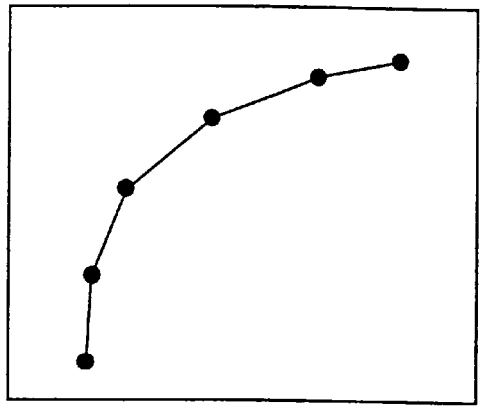
COURCE OF ROAD
DETERMINED
FROM MAP INFORMATION
FIG. 3a
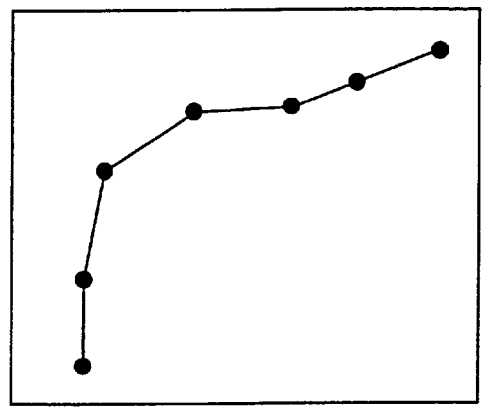
TRACK OF FRONT WHEEL
DETERMINED FROM
CAMERA IMAGE
FIG. 3b
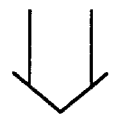
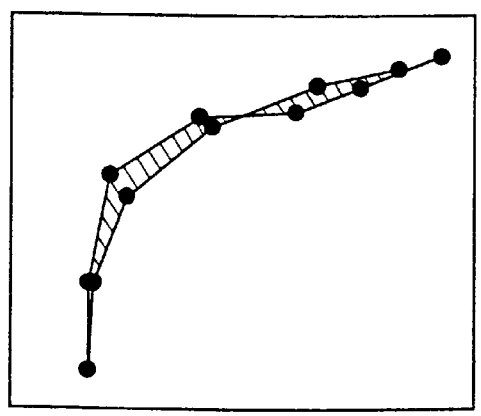
DEVIATION
FIG. 3c

CONTROL DEVICE AND METHOD FOR A VEHICLE RUNNING SAFELY

FIELD OF THE INVENTION

The present invention relates to a control device and method for assuring safe running of automobiles.

BACKGROUND OF THE INVENTION

A technique is known which checks the driving skill of a driver and reflects a result of the check on automotive control. Such a technique is disclosed, for example, in Japan Patent Laid-Open No. 191315/1994, which uses the rate of change of angle of the steering wheel and the rate of change of lateral acceleration in determining the driving skill of a driver.

The above driving ability decision method has the drawback that when a car skids laterally while cornering and the driver performs highly technical steering operations (such as countersteering whereby the driver steers in a direction opposite the direction of turning), a precise driving ability decision is rendered impossible.

SUMMARY OF THE INVENTION

The object of this invention is to provide a control device and method to realize safe running of automobiles by making accurate decision on the driving skill of a driver. The above objective is realized by reflecting the result of decision, which was obtained by precise driving ability decision, on an automotive power train control. In more detail, the above problem can be solved by the device which comprises: a means for setting a target course for the car; a means for determining the course followed by the car wheels; a deviation calculation means for calculating a difference between the two courses; a driving ability decision means for determining the driving skill of a driver; a control parameter calculation means for calculating control parameters corresponding to the driving skill; and a power train control means required to control the driving of the car.

The power train control means refers not only to fuel injection control, ignition timing control, throttle control and automatic transmission speed change control but also to any other control means required for automotive running control and safe driving, such as steering control and automatic braking control.

In the above target course setting means, a car position detection means such as a car navigation system calculates a target locus to be traveled from the present car position. The means for determining the course followed by the car wheels calculates a track on which the wheels of the car are actually running based on the image information from a forward viewing car-mounted camera. The difference between these two courses is calculated by the deviation calculation means and forms a reference used in the decision made by the driving ability decision means. The control parameter calculation means calculates control parameters that correspond to the result of the driving ability decision and which are used by the power train control means for the engine torque control. Thus, the power train control is performed according to the driving ability of the driver, enabling safe running of a vehicle.

BRIEF DESCRIPTION OF THE DRAWINGS

FIG. 2 is a system configuration diagram of this invention;

FIG. 3 is conceptual diagrams showing how the course deviation is calculated;

DETAILED DESCRIPTION OF THE PREFERRED EMBODIMENTS

Now, the control device and method for assuring safe running of a vehicle will be explained in connection with preferred embodiments illustrated in the accompanying drawings.

Figure 1:
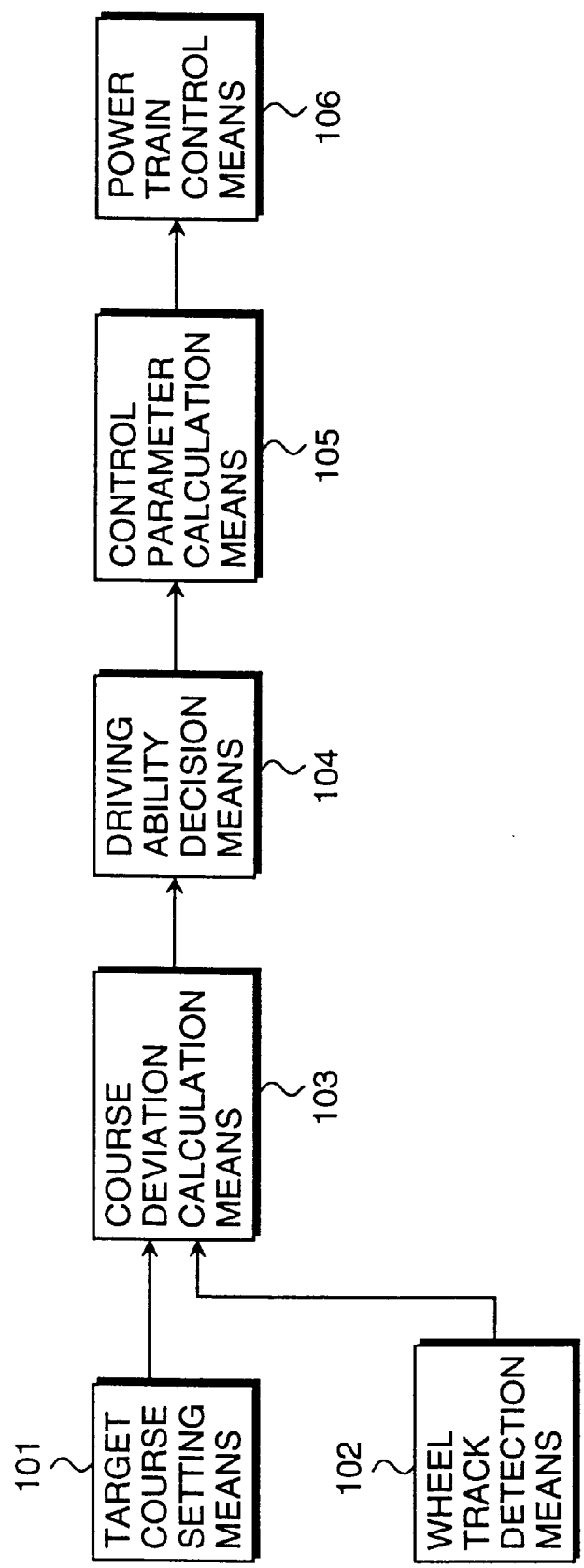
FIG. 1 is a block diagram showing a basic configuration of this invention.

FIG. 1 is a block diagram showing the basic configuration of this invention. A course set for the car, i.e., the course of a road along which the car is running, is calculated by a target course setting means 101. The target course setting means may include a car position detection means of a navigation system or image information from a camera mounted on the car before the car enters a corner. Next, the actual course followed by the wheels of the vehicle is determined by a wheel tracks detection means 102, which may include a forward viewing car-mounted camera. The car-mounted camera is mounted so that it faces in the same direction as the front wheels of the vehicle. Based on the image information from the car-mounted camera, it is possible to calculate the course followed by the front wheels. A course deviation calculation means 103 calculates the difference, that is the deviation between the set course and the actually course followed by the vehicle. A driving ability decision means 104 evaluates the driving ability of a driver in three stages—a skilled driver, an average driver and a novice driver—using a result of the calculation performed by the deviation calculation means 103 as a reference for the decision. A control parameter calculation means 105 calculates a control parameter that corresponds to the driving ability and which is output to a power train control means 106.

FIG. 2 shows an example system configuration. A locator 201 determines the position on a map of the car in which it is mounted, by using information from GPS 202, angular speed sensor 203, earth magnetism sensor 204, wheel velocity sensor 205, FM multiplex broadcast receiver 206, beacon receiver 207, and map 208. A safe-running controller 209 comprises an I/O interface 210, a CPU 211 and a memory 212. The safe-running controller 209 judges the driving skill of a driver from the position information from the locator 201 and the image information from the camera 213, and calculates a control parameter for ensuring the safe running of a vehicle. The camera 213 is mounted so that it faces in the same direction as the front wheels of the vehicle. Based on the result of calculation performed by the safe-running controller 209, the engine 220 is controlled by a valve timing controller 214, a throttle controller 215, an ignition timing controller 216 and a fuel injection controller 217. A transmission controller 218 controls an automatic transmission 221, and a brake controller 219 controls a brake control actuator 222.

Next, an example case is described, in which the course deviation is calculated by using the navigation system and the forward viewing car-mounted camera, which is mounted to face in the same direction as the front wheels. FIG. 3(a) is a schematic showing the course of the road determined from the map information; FIG. 3(b) is a schematic showing the course followed by the front wheels determined by using the image from the camera. Combining them results in a diagram of FIG. 3(c), in which the shaded portion is a deviation between the two courses. The radius of curvature of the road obtained from the map information represents a target courses, and the radius of curvature of the road calculated from the camera image represents the course followed by the wheels. The difference between the two radii of curvature is calculated as the course deviation.

Figure 4A:
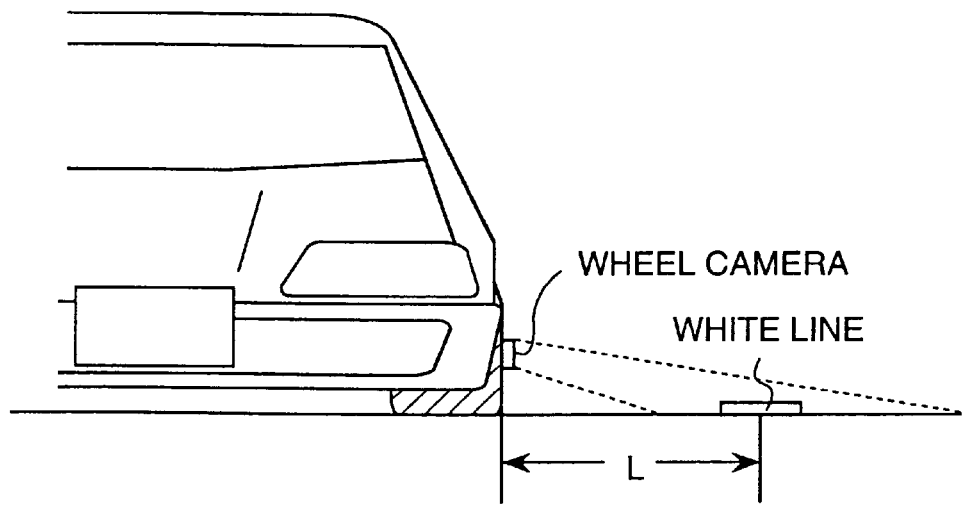
FIG. 4 is an image of the loci obtained from a camera.
Figure 4B:
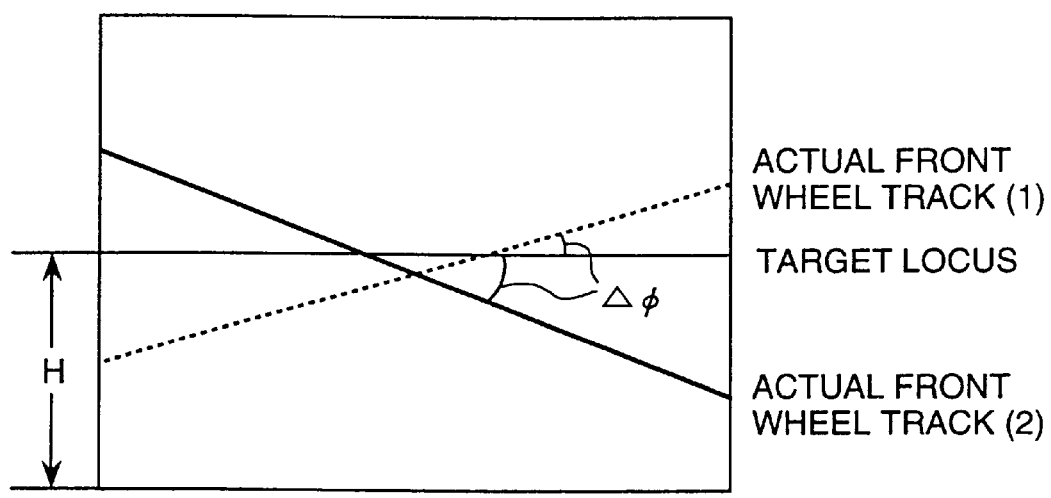

Next, let us explain about a case where the course deviation is calculated by using a camera, which is mounted on the front wheel to face in the direction of wheel axis. FIG. 4(a) and 4(b) show the position where the wheel camera is mounted and the image of a white center line on the road taken by the camera. The wheel camera mounted on the front wheel is directed perpendicular to the center line (white line) on the road. Hence, when the front wheels follow the same course as that of the road, the white line as viewed by the camera is horizontal. That is, the horizontal direction ($\Delta\Phi = 0$) is a target course. When the car approaches the white line, the image of the white line is as shown by the course (1) of FIG. 4. When the car moves away from the white line, its image is given by the course (2). The gradient with respect to the horizontal direction $\Delta\Phi$ is calculated as the course deviation. The height H of the white line as seen by the camera is taken as a function of the distance L between the wheel and the white line. This method of using the wheel camera and the white line can also be applied to the recognition of a guard rail (or the edge of the road) by a camera mounted on the left front wheel.

Figure 5:
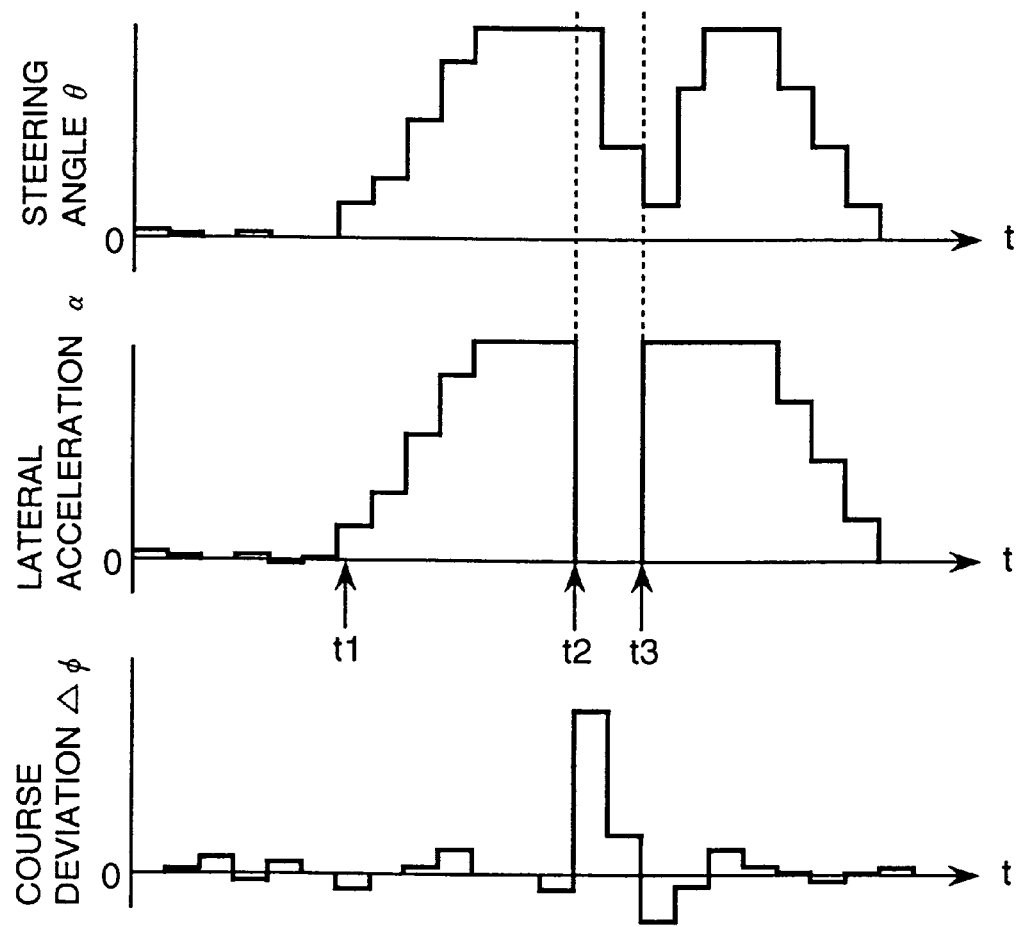
FIG. 5 is a time chart showing changes over time of parameters when a skilled driver runs a corner.

FIG. 5 is a time chart showing changes over time t of parameters when a skilled driver runs a corner, the parameters including a steering angle $\theta$, a lateral acceleration $\alpha$ of the car and a course deviation $\Delta\phi$. This example represents a case where the vehicle loses its grip on the road during cornering and a driver recovers the road grip by steering operations. At time t1, the car enters a corner and the driver starts turning the steering wheel. The car then begins to turn and the lateral acceleration $\alpha$ increases. When a proper steering angle is reached, it is maintained until the cornering is finished. If, however, the tire grip is suddenly lost at time t2 (slip factor $\mu$ decreases) resulting in a lateral skidding of the car, the lateral acceleration $\alpha$ (t2) becomes zero. In such a circumstance, a skilled driver would steer the wheel in a direction opposite the direction in which the car is turning (countersteering), to cause the front wheels of the car to trace the course of the road. A novice driver is not expected to perform such operations. When the car skids, the course deviation $\Delta\phi$ becomes large. If the time taken to correct the course by countersteering is short, the driver can be judged to have a high level of driving skill. Hence, it is possible to make a precise decision on the driving skill of a driver by using as parameters for the driving ability decision the deviation between the road course and the front wheel track and the time during which the deviation exists.

Figure 6:
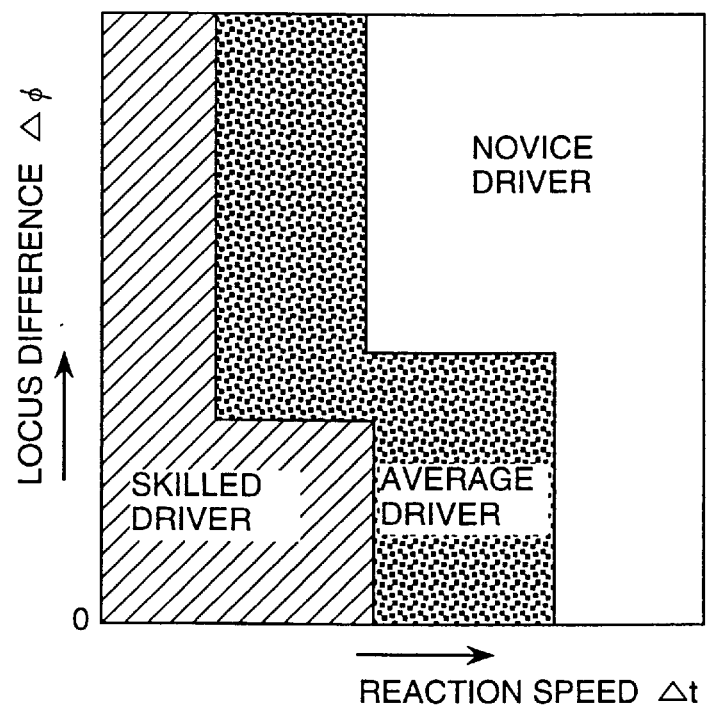
FIG. 6 is an example of data map used to decide the driving ability.
Figure 7:
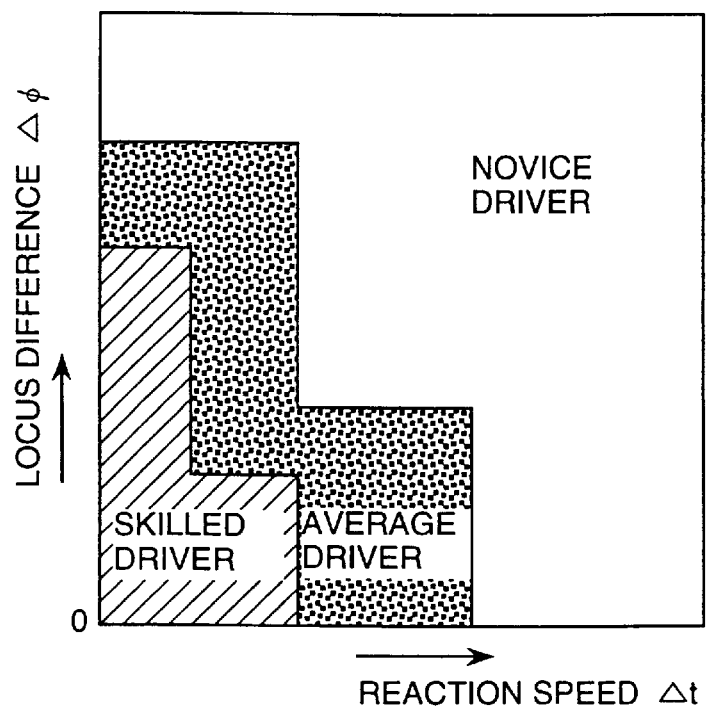
FIG. 7 is an example of data map used to decide the driving ability.

Next, let us explain about a case where the parameters used as criteria for the driving ability decision are stored in memory of the safe-running controller as a map. FIG. 6 shows a driving ability decision map for low and medium car speeds and FIG. 7 a driving ability decision map for high car speed. The abscissa is taken as a reaction speed $\Delta t$ which represents the time during which the course deviation exists and the ordinate represents the course deviation $\Delta\phi$. Using these two parameters, the driving ability of a driver is evaluated in three stages—skilled, average and novice driver. When, for example, the reaction speed is quick even if the course deviation is large, as during the countersteering, the driver is judged as a skilled driver. When, on the other hand, the reaction speed is slow even if the course deviation is small, the driver is decided to be a novice. Because these two driving ability decision parameters change greatly according to the car speed, there are provided a map for low and medium car speeds and a map for high speed. Uncontrolled driving by a skilled driver whose driving skill is close to that of the average driver can therefore be forestalled by expanding the novice driver area and shifting the average driver area toward the skilled driver area during high-speed driving, as shown in FIG. 7.

Figure 8:
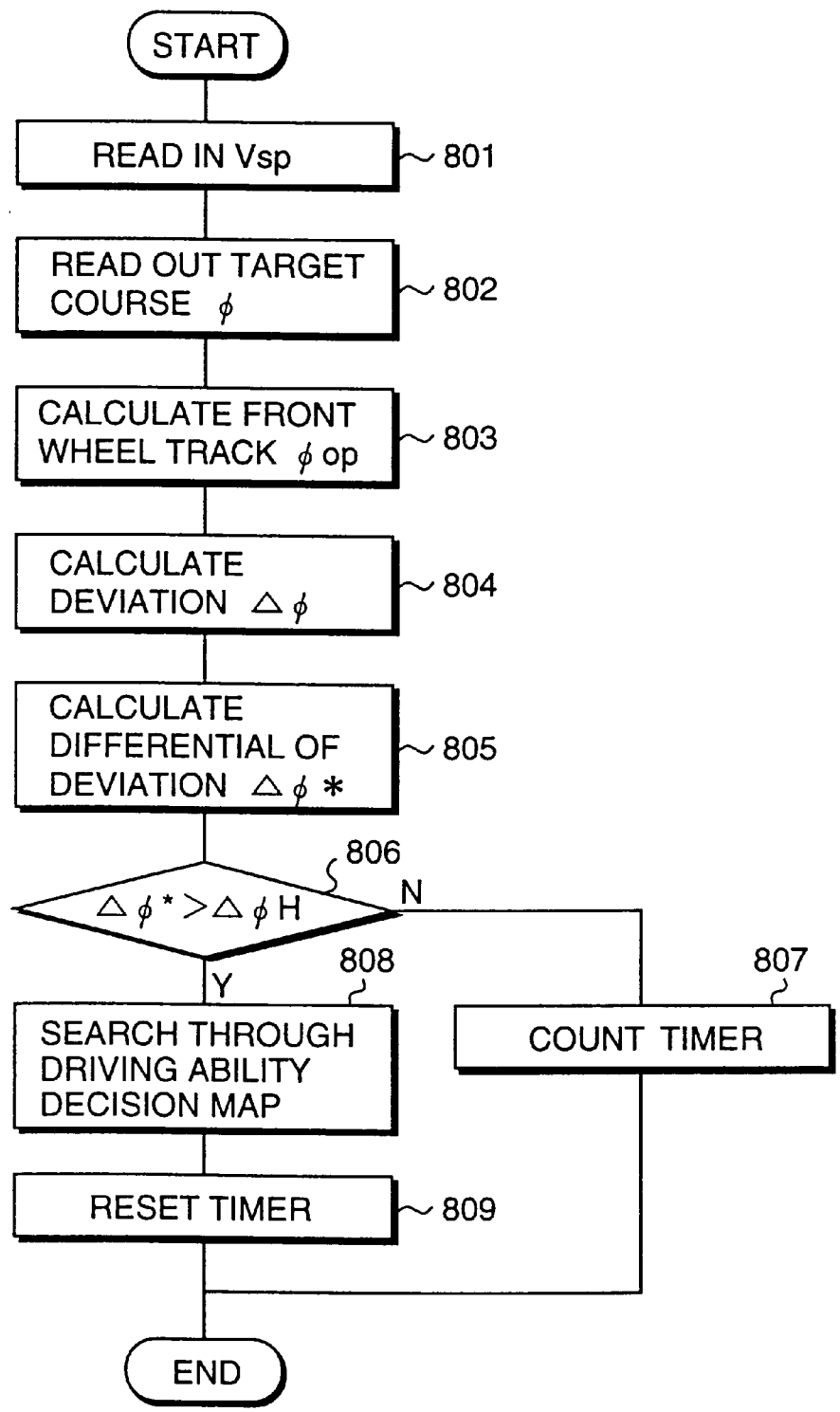
FIG. 8 is a flow chart for making a decision on the driving ability.

FIG. 8 shows a flow chart of the driving ability decision means. At step 801 the car speed Vsp is read in from a sensor. At step 802, information on the radius of curvature $\phi$ of the road on which the car is running is read from the memory. Step 803 calculates the actual course $\phi$op being described by the front wheels by processing the image from the camera. Next, step 804 performs calculation on the following formula.

$$\Delta\phi = |\phi op - \phi| \qquad (1)$$

This $\Delta\phi$ is the course deviation and is used as a criterion for the driving ability decision. Step 805 calculates the following formula.

$$\Delta\phi^* = \frac{\Delta\phi(t + \tau) - \Delta\phi(t)}{\tau} \qquad (2)$$

Here $\tau$ is a cycle in which the course deviation $\Delta\phi$ is calculated. Calculating the equation (2) determines the differential $\Delta\phi^*$ of the course deviation. Next, at step 806 a comparison is made of the differential $\Delta\phi^*$ and a predetermined threshold value $\Delta\phi H$. When the threshold value is not exceeded, i.e., $\Delta\phi$ remains nearly unchanged, the program moves to step 807 where it counts a timer before ending the processing. When the threshold value is exceeded, i.e., $\Delta\phi$ changes, the program searches through the driving ability decision map at step 808 to judge the driver's ability in three stages—skilled, average and novice driver—and output the driving ability parameter Skl. Then, at step 809 the program resets the timer and ends the processing.

Figure 9:
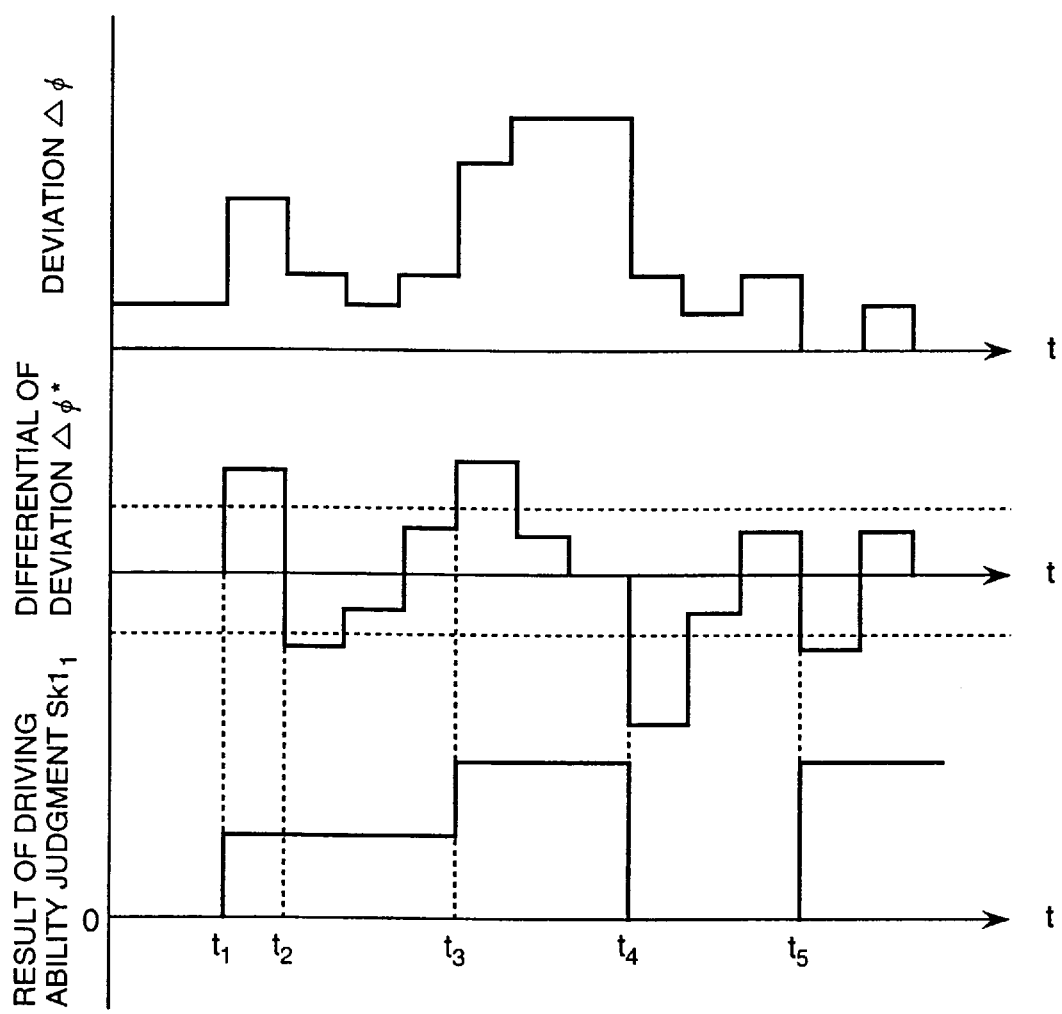
FIG. 9 is a time chart showing changes over time of quantities used to decide the driving ability.

FIG. 9 shows changes over time of the course deviation $\Delta\phi$, the differential of the course deviation $\Delta\phi^*$ and the result of driving ability decision $Skl_1$. The deviation is calculated in a predetermined cycle and its differential is similarly calculated. When the differential of the course deviation exceeds the threshold value, the driving ability decision is made in a t1–t5 period to produce a driving ability assessment $Skl_1$. The driving skill rate is output as 3 for a skilled driver, 2 for an average driver and 1 for a novice driver. From the driving ability assessment $Skl_1$, the average is calculated as described later to determine the driving skill of the driver.

The above method permits accurate determination of the driver's ability not only when the car is cornering but also when it is running on a straight road. For example, when the car travels on a road with a small frictional coefficient (such as a snow-covered road), the car may skid. In such an event, a skilled driver performs steering operations so that the front wheel track will match the road course. Therefore, it is possible to make a precise driving ability judgment also during the linear running, by calculating the target course and the front wheel track and determining the difference between them.

Figure 10:
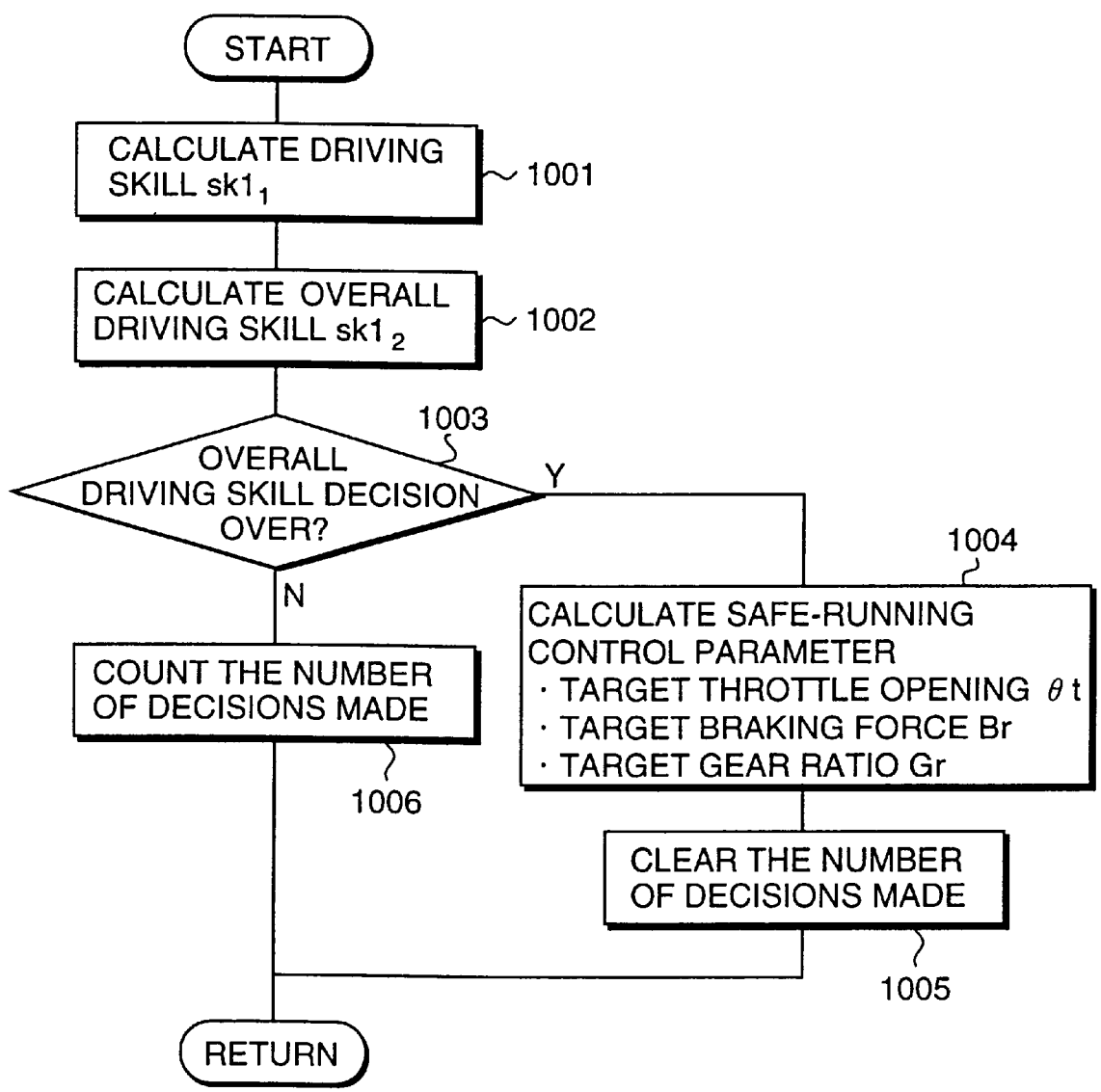
FIG. 10 is a flow chart for control for safe driving.

FIG. 10 shows the safe-running control flow chart using the result of the driving ability decision. At step 1001, the driving ability $Skl_1$ is calculated. Next, at step 1002 an overall driving ability $Skl_2$ of the driver, which is an average of the above $Skl_1$, is calculated. Step 1003 checks whether or not the overall ability decision has ended, as by checking if the car has traveled a predetermined distance or for a predetermined time. When the decision of step 1003 is "yes," the program moves to step 1004 where it determines safe-running control parameters that will ensure safe running conditions. The process of determining the safe-running parameters is described below. First, to control the engine torque, the throttle opening for safe running is calculated as a target throttle opening θt from the following equation.

$$\theta t = f1 \ (Sto, Vsp, Ne, Skl_2) \quad (3)$$

where Sto is an accelerator opening, Vsp is a car speed, Ne is an engine revolution, and $Skl_2$ is an overall driving skill. Next, to directly lower the car speed by braking, the brake application force is controlled. The brake application force for safe running is calculated as a target brake application force Br from the following equation (4).

$$Br = f2 \ (Brd, Vsp, Skl_2) \quad (4)$$

where Brd is a brake application force, Vsp is a car speed and $Skl_2$ is an overall driving skill. Next, to reduce the car speed by engine brake by lowering the gear ratio of the transmission, a gear ratio control is performed. The gear ratio for safe running is calculated as a target gear ratio Gr from the following equation (5).

$$Gr = f2 \ (Tvo, Vsp, Skl_2) \quad (5)$$

where Tvo is a throttle opening, Vsp is a car speed and $Skl_2$ is an overall driving skill. These safe-running control parameters are calculated and the processing at step 1004 is ended. Next, step 1005 clears the number of decisions made and ends its processing. When the decision of the step 1003 is "no," the program moves to step 1006 where it counts the number of decisions made and ends its processing in this step. Here the overall driving ability rate $Skl_2$ is initially set to a skilled driver at time of engine startup and, after the first overall driving ability decision is made, the safe-running control is started.

Figure 11:
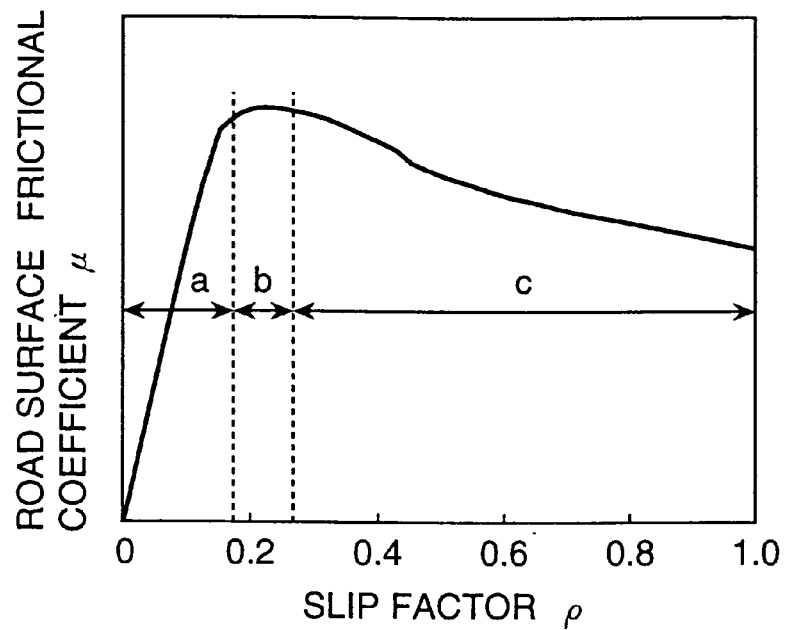
FIG. 11 is a diagram showing the relation between a slip factor and a friction coefficient of the road surface.
Figure 12:
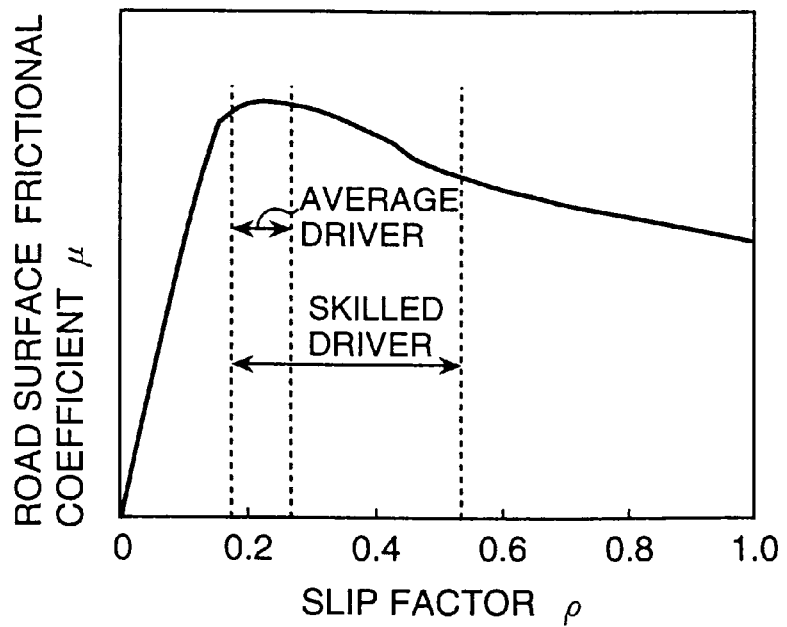
FIG. 12, like FIG. 11, is a diagram showing the relation between a slip factor and a friction coefficient of the road surface, and the control region of ABS (antilock braking system) according to the driving ability parameter.

Next, we will describe an example case where the driving skill parameters produced by the driver's ability decision are used in the ABS (antilock braking system). The ABS is a braking system that offers stable braking to a vehicle on a slippery road surface by controlling the braking force according to the frictional coefficient between the tire and the road surface to avoid the locking of wheels. FIG. 11 shows the relation between the slip factor and the frictional coefficient of road surface. The slip factor ρ of the wheels is defined by the following equation (6).

$$\rho = \frac{V - r\omega}{V} \quad (6)$$

where V is a car speed, ω is an angular speed of wheel and r is an effective radius of wheel. When the ABS control is performed, the braking force is controlled by considering the direction stability and steering performance of the car during braking so that the control area will fall within a high-μ area (area b in FIG. 11) of the stable braking region that can deal satisfactorily with most road surface conditions. Here, the ABS control region is changed according to the driving ability parameters. FIG. 12 shows the ABS control regions according to the driving ability parameters. The ABS control region for a novice is the same as the conventional one; the control region for an average driver is expanded; and for a skilled driver the ABS control is canceled. Changing the ABS control region according to the driver's skill in this way allows a driver with a high level of driving skill to enjoy driving without being constrained by the ABS control region.

With this invention of the above configuration, the vehicle's power train is controlled according to the driving ability of a driver so that the dynamic performance of the vehicle is optimized in connection with the driving skill, realizing safe running of the vehicle.

What is claimed is:

1. A vehicle safe-running control device comprising:
   a target course setting unit;
   an actual course detection unit;
   a calculating unit which
      determines a course deviation, based on a difference between a target course set by the target course setting unit and an actual course detected by said actual course detection unit based on an actual course of a wheel that determines the direction in which the vehicle travels;
      evaluates driving ability of a driver of the vehicle according to the course deviation; and
      calculates control parameters based on the evaluated driving ability; and
   a power train control unit which controls operating systems of the vehicle based on the control parameters.

2. A vehicle safe-running control device according to claim 1 wherein said operating systems comprise at least one of a vehicle drive train and vehicle brakes.

3. A vehicle safe-running control device according to claim 1, wherein the target course setting unit sets a target course based on an output from a navigation system.

4. A vehicle safe-running control device according to claim 1, wherein the target course setting unit sets a target course based on image information obtained from a forward viewing vehicle-mounted camera.

5. A vehicle safe-running control device according to claim 1, wherein the actual course detection unit determines an actual course of the vehicle based on image information obtained from a vehicle-mounted camera which faces in the same direction as a vehicle wheel.

6. A vehicle safe-running control device according to claim 1, wherein the vehicle wheel is a front wheel.

7. A vehicle safe-running control device according to claim 1, wherein the actual course is a radius of curvature.

8. A vehicle safe-running control device according to claim 1, wherein:

the calculating device includes a memory having stored therein a decision map involving a travel locus difference and a time during which a course deviation exists; and driving ability of a driver is evaluated based on the decision map.

9. A vehicle safe-running control device according to claim 8, wherein the decision map differs according to the speed of the vehicle.

10. A vehicle safe-running control device according to claim 1, wherein said calculating unit evaluates driving ability of the driver of the vehicle whenever a rate of change of the course deviation exceeds a predetermined threshold level.

11. A vehicle safe-running control method comprising the steps of:

detecting an actual course followed by a wheel that determines a direction in which the vehicle travels;

calculating a course deviation, based on a difference between the detected actual course and a target course which is stored in a memory;

evaluating driving ability of a driver of the vehicle according to the course deviation;

calculating control parameters based on the evaluated driving ability; and controlling a power train of the vehicle based on the calculated control parameters.

12. A vehicle safe-running control method according to claim 11, wherein said operating systems include at least one of a vehicle drive train and vehicle brakes.

13. A vehicle safe-running control method according to claim 11, wherein said step of evaluating driving ability is performed whenever a rate of change of the course deviation exceeds a predetermined threshold value.

14. A safe-running control system for a vehicle, comprising:

a camera movably mounted on a front wheel of said vehicle, aligned with a rotational axis of the front wheel;

a calculating unit which:
    recognizes a line on a road based on an image obtained from the camera;
    determines a gradient of the recognized line on the road;
    evaluates driving ability of a driver of the vehicle by using a value of the gradient determined by the gradient calculation means; and
    calculates control parameters based on the evaluated driving ability; and a power train control unit which controls operating systems of the vehicle based on the control parameters.

15. A vehicle safe-running control system according to claim 14 wherein said operating systems comprise at least one of a vehicle drive train and vehicle brakes.

16. A vehicle safe-running control system according to claim 14, wherein said calculating unit evaluates driving ability of the driver whenever a rate of change of the gradient exceeds a predetermined threshold value.

17. A vehicle safe-running control method comprising the steps of:

photographing an image in a direction perpendicular to a direction of travel of front wheel of a vehicle;

recognizing a line on a road by using the image;

calculating a gradient of the recognized line on the road;

evaluating driving ability of a driver of the vehicle by using the calculated gradient of the line;

calculating control parameters based on the driving ability; and controlling a power train of the vehicle according to the calculated control parameters.

18. A vehicle safe-running control means according to claim 17 wherein said controlling step includes controlling at least one of a vehicle drive train and vehicle brakes.

19. A vehicle safe-running control method according to claim 17, wherein said step of evaluating driving ability is performed whenever a rate of change of said gradient exceeds a predetermined threshold value.

20. A vehicle safe-running control system for controlling operation of a vehicle, comprising:

an actual course detector;

a memory storing a target course for the vehicle;

a calculating device which
    calculates a course deviation based on a difference between the target course and an actual course detected by the actual course detector, based on an actual course of a wheel that determines the direction in which the vehicle travels;
    evaluates a driving ability of a driver of the vehicle according to the course deviation; and
    calculates a control parameter based on the driving ability; and a power train control device for controlling a power train of the vehicle according to the calculated control parameter.

* * * * *